Oct. 19, 1926.
J. STEIN
1,603,812
METHOD FOR MAKING STRIPED RUBBER SHEETING
Filed Jan. 30, 1924   3 Sheets-Sheet 1
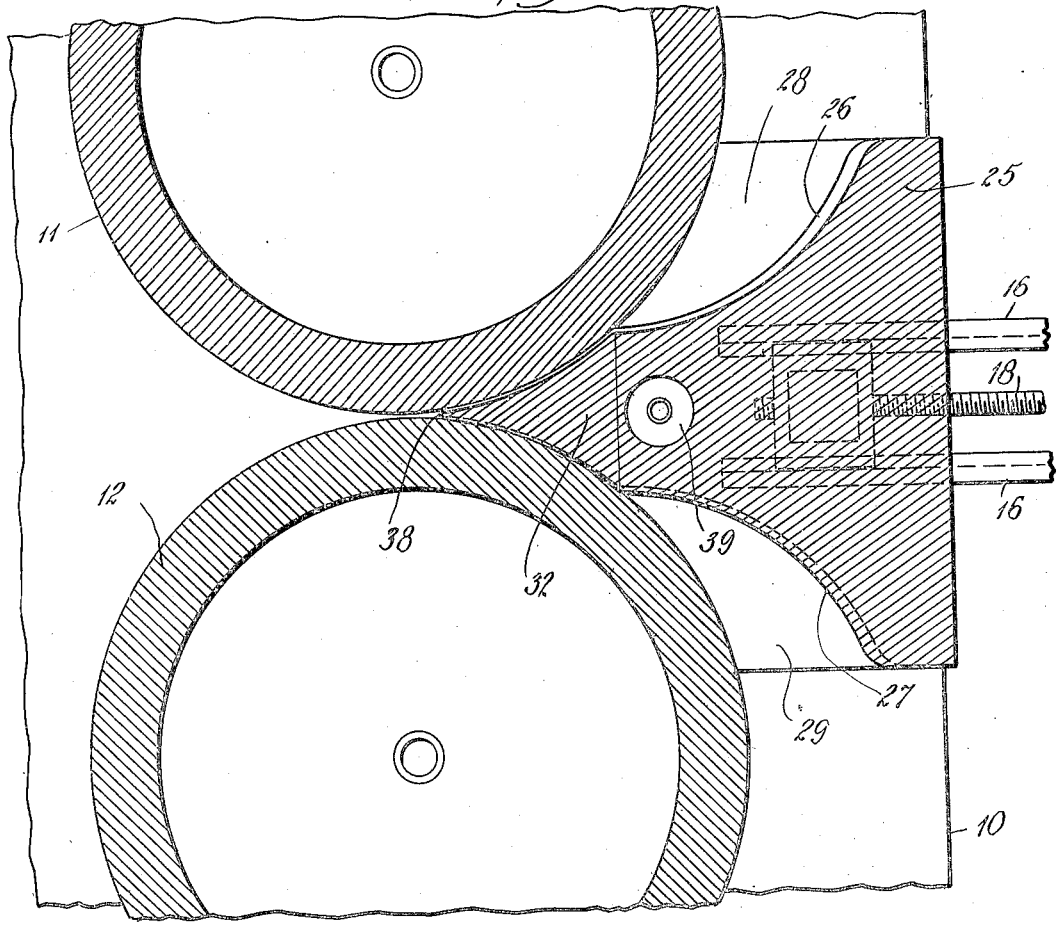
Fig. 1
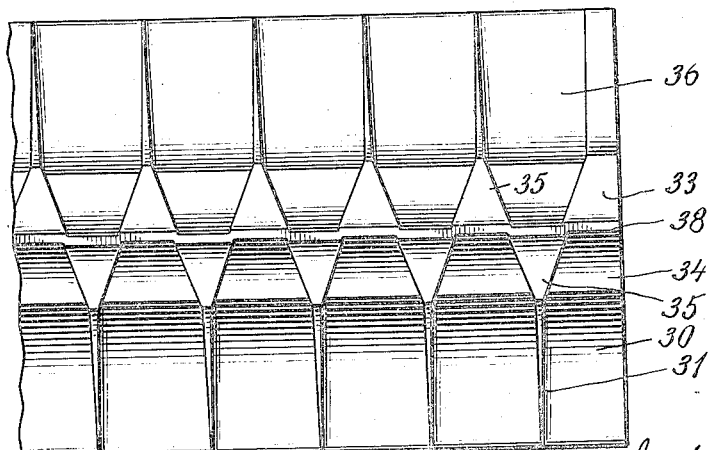
Fig. 2
Fig. 10
INVENTOR
Jacob Stein
BY
his ATTORNEYS Oct. 19, 1926.  
J. STEIN  
1,603,812  
METHOD FOR MAKING STRIPED RUBBER SHEETING  
Filed Jan. 30, 1924  3 Sheets-Sheet 2
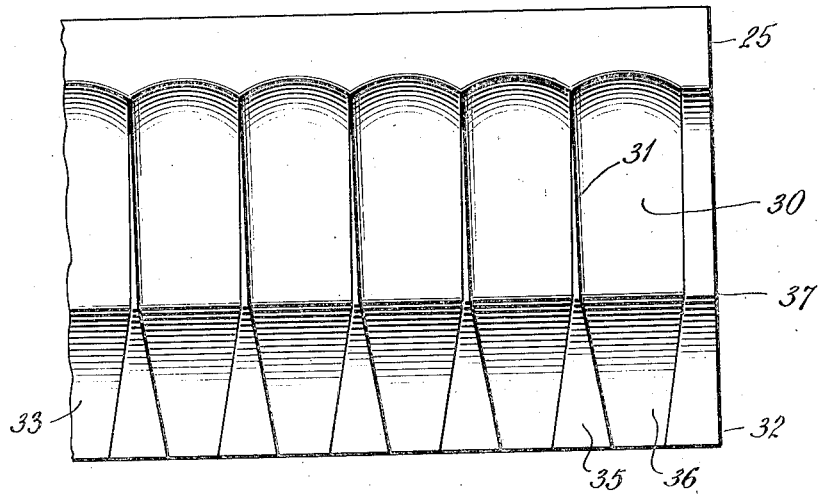
Fig. 3,
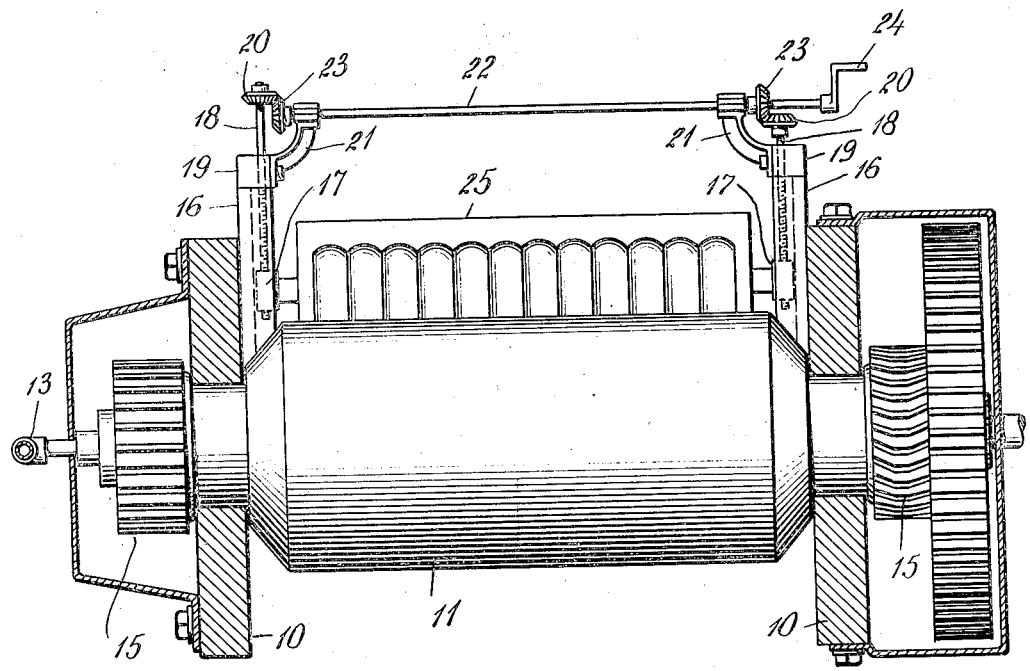
Fig. 4,
INVENTOR  
Jacob Stein  
BY Pennie, Davis, Marvin & Edmonds  
his ATTORNEYS Oct. 19, 1926.
J. STEIN
1,603,812
METHOD FOR MAKING STRIPED RUBBER SHEETING
Filed Jan. 30, 1924    3 Sheets-Sheet 3
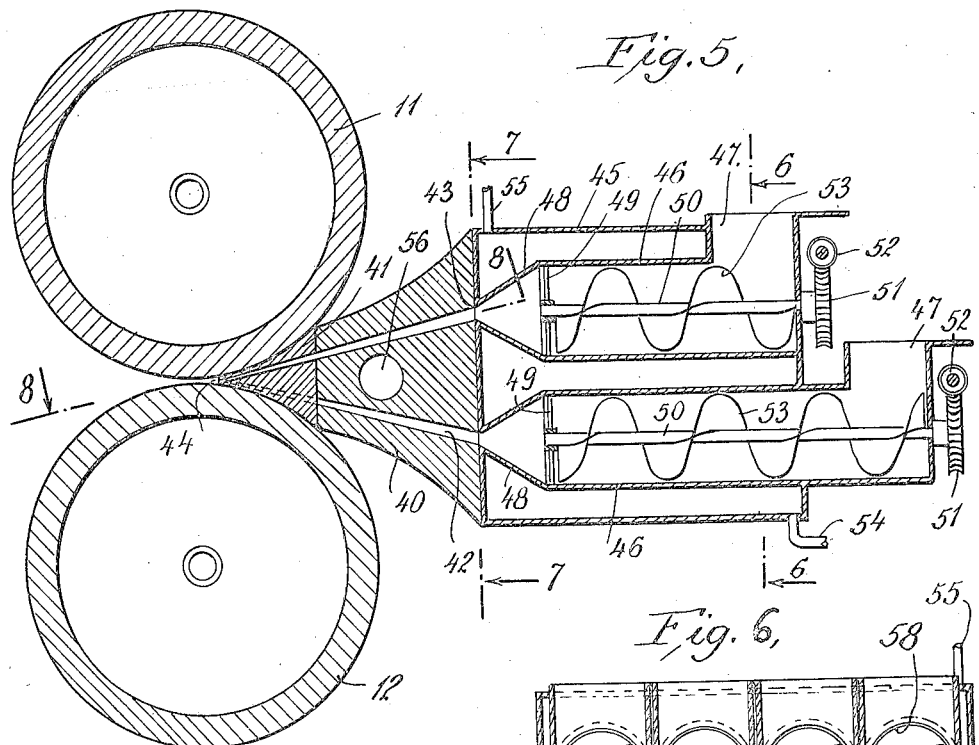
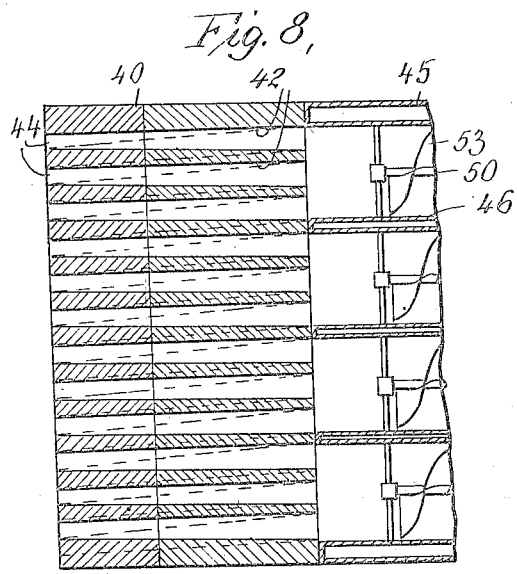
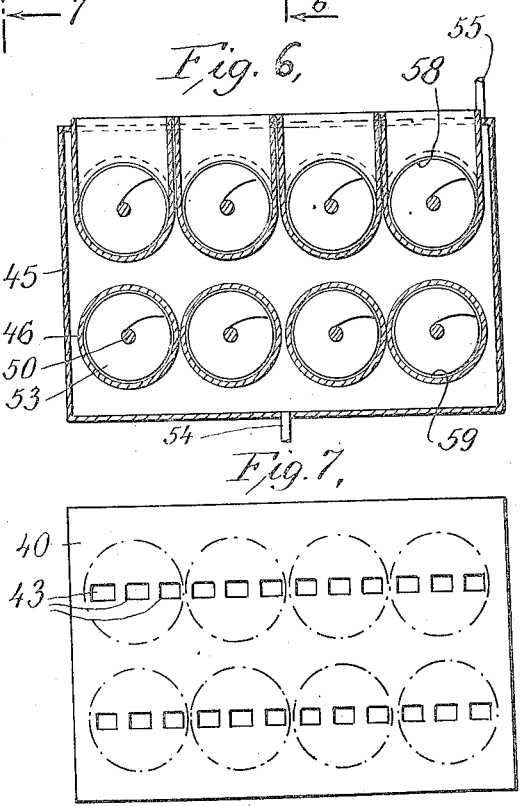
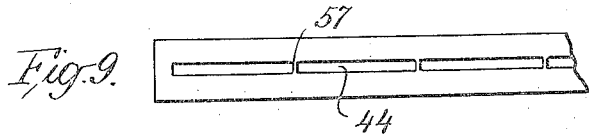
INVENTOR
Jacob Stein
BY
Pennie, Davis, Marvin & Edmonds
his ATTORNEYS Patented Oct. 19, 1926.

1,603,812

UNITED STATES PATENT OFFICE.

JACOB STEIN, OF NEW YORK, N. Y.

METHOD FOR MAKING STRIPED RUBBER SHEETING.

Application filed January 30, 1924. Serial No. 689,420.

This invention relates to a novel rubber product and to a method and apparatus by which it may be produced. The product referred to is striped rubber sheeting either with or without a backing sheet and consists of a plurality of different colored strips which are united autogenously along their abutting edges to produce a homogeneous sheet of uniform strength and thickness. The method and apparatus are intended to permit such a product to be continuously formed in a single operation so that masses of plastic rubber compounds are sheeted out without interruption into the form of striped rubber sheets of indefinite length, of any selected width and thickness and having the stripes arranged according to any desired pattern.

The production of striped rubber sheeting has been carried on, heretofore, in several ways, none of which is altogether satisfactory. According to one method a sheet of rubber is first formed and then strips of rubber of a contrasting color are cut from a sheet and cemented to the backing sheet in the proper position. The finished striped sheet, made according to this practice, consequently consists of a backing sheet and many individual strips cemented to it. The production of such material is difficult and expensive by reason of the care which must be taken in cementing the strips in place, and the finished product is not of uniform thickness throughout. Furthermore, the application of the strips by means of cement is unsatisfactory since under certain conditions the cement may become loosened and the strips will then be displaced. In this method the rubber materials employed are vulcanized prior to the formation of the finished product.

In another method for the production of this type of material rubber in an unvulcanized form is sheeted out and sheets of the unvulcanized rubber of the desired colors are laid face to face and passed beneath a knife mechanism which makes a cut extending through the length of the sheets. In this cutting the edges of the two sheets are forced together and united. After the material has passed beneath the knife, the two sheets are opened up and laid flat so as to lie substantially in the same plane, and thereafter they are passed through rolls which flatten the sheets at the line of union. By reason of the manner in which the edges are united it will be seen that the sheets are not connected altogether by the adhesion of their edges, but this union is, in part, produced by the adhesion of portions of the faces of the two sheets which lie in contact. After the formation of a pair of connected strips the process must be repeated to add a third strip, and eventually by repetition, the sheet may be built up to the desired width. It will be seen that this is unsatisfactory and consumes much time. Also the individual strips are not bound firmly together and there is liable to be an added thickness of the material along the joint.

It will be seen that according to both of the processes above briefly described the manufacture of the striped rubber sheeting is not continuous; that is, sheets of material of the colors which are to appear in the finished product must first be formed and these sheets must then be cut into strips of the desired width and thereafter connected together to form the finished sheet. The formation of this finished sheet, therefore, is altogether separate from the process by which the original sheets of contrasting colors were produced and, therefore, the finished sheeting may be said to be formed by two major steps, in one of which sheets of different colors are formed and in the other, these sheets are cut into strips which are to be united. Also, the finished product is, in the one instance, formed of a backing sheet and a plurality of strips cemented to it so that throughout these strips the sheet has an increased thickness, while according to the other process, the finished product also has regions of increased thickness resulting from the manner in which the strips are connected together.

The present invention is intended to provide a striped rubber sheeting which is homogeneous, and of uniform strength and thickness throughout. This sheeting has no regions of weakness due to variations in thickness or due to the manner in which the strips of which it is formed are connected together. The invention also involves the provision of a method and apparatus for production of this material and according to this method the finished rubber sheet is formed from the plastic rubber mix in a single operation; that is to say, that the plastic rubber is formed into strips of the desired contrasting colors and as an incident to the formation the strips are united into a sheet which becomes the finished product without further cutting, cementing or operations of a similar character. This method produces the sheeting continuously and eliminates one step of the old processes above briefly referred to.

One form of the apparatus by which this method may be practiced consists of a calender mill provided with a pair of rolls of the usual construction. This mill is of the type ordinarily used for sheeting out the plastic rubber compound, but associated with these rolls in the present apparatus, is a block having an extension which is given a contour such that portions of the extension will lie against the faces of the rolls. The block is formed in such a way that supplies of the plastic rubber are maintained in contact with the rolls but in separated relation and the extension is formed with a plurality of channels which, with the surfaces of the rolls, form feeding passages. These channels taper in width and, at their discharge ends, the width of the channels corresponds closely to the width of the stripes which are to appear in the finished sheet. The discharge end of the extension is located close to the bite of the rolls and the discharge ends of the channels are placed in such relation as to cause strips of contrasting colors to be fed between the rolls so that these strips will assume the positions required by the pattern to be produced. The supplies of rubber of different colors maintained in separated relation by the block, lie in contact with the surfaces of the rolls so that as the latter are rotated the rubber compound is forced forwardly by the rolls through the channels and thus discharged between the rolls in strips. These strips are then subjected to the action of heat and pressure by the rolls which results in their union into a single sheet.

This sheet will be seen to be composed of strips which are preformed and which are discharged substantially in a plane. The strips are united autogenously and are connected only through the extent of their adjacent edges. No portions of the faces of the strips come into contact so as to take any part in their union. Consequently the sheet is of uniform thickness throughout and no foreign materials are required in its production. Also a sheet having stripes of several colors may be formed in a single operation, and, by proper selection of the channels in the extension of the block, the stripes appearing in the finished sheet may be of any desired width and arranged according to any desired pattern. The apparatus is capable of adjustment so that not only may the strips be formed in any desired width, but they may also be of any selected thickness so that by this apparatus a finished sheet of any desired pattern and weight may be produced. Since the operation by which the striped sheet is formed is a continuous one, a sheet of indefinite length may be formed and this is a point of considerable advantage over the previous processes in which the difficulty of handling the material cuts down the size in which the finished products may be produced.

In another form of the invention the rolls themselves are not used for the feeding of the plastic rubber and its formation into strips. A suitable feeding apparatus is provided for this purpose which may take the form of a screw which feeds the plastic rubber mix through passages in a block similar to that previously described. One or more screws may be provided for each kind of rubber which is to be used and the passages have discharge outlets which are located in an extension of the block lying between the bite of the rolls. These discharge outlets are located in proper relation so that the rubber fed through them may take the position required according to the pattern, and the strips formed by the passage of the plastic material through the passages are subjected to heat and pressure in the rolls so as to unite them into the finished sheet. I desire to point out that in referring to this sheet as finished I mean finished so far as the production of its pattern is concerned. The sheet which comes from the rolls must, of course, be later subjected to a vulcanizing process before it is ready for use, as is the case whenever plastic rubber compounds are sheeted out in such a machine.

In the accompanying drawings I have illustrated that embodiment of the invention which I now prefer, and in these drawings, Fig. 1 is a vertical sectional view, largely diagrammatic, of a portion of the apparatus, Fig. 2 is an end view of a portion of the feeding mechanism, Fig. 3 is a detail top plan view of the mechanism illustrated in Fig. 2, Fig. 4 is a top plan view, partly in section, of the apparatus, Fig. 5 is a view similar to Fig. 1, showing a modified form of apparatus, Fig. 6 is a vertical sectional view on the line 6—6 of Fig. 5, Fig. 7 is a sectional view on the line 7—7 of Fig. 5, Fig. 8 is a sectional view on the line 8—8 of Fig. 5, and Fig. 9 is an edge view of a portion of the discharge end of the feeding apparatus, Fig. 10 is a view in transverse cross section of a piece of the new product.

Referring now to these drawings, the apparatus is shown in Figs. 1 to 4 in that form in which it is to be used for the production of a striped sheeting consisting of strips of two different colors which are of equal width and alternately disposed. This mill is generally of well-known construction and consists of suitable frame members 10 in which are mounted rolls 11 and 12. These rolls are of steel and are hollow so that steam may be introduced into the interior of them as, for instance, by the inlet pipe 13. The journals of the rolls are mounted in the frame members and provided with suitable driving gears, referred to generally by the reference character 15, so that the rolls may be driven simultaneously in opposite directions from any desired source of power. These rolls are relatively adjustable toward and away from each other by well-known mechanism and the construction of the mill in general is that ordinarily employed in this connection.

Mounted on the frame members opposite the bite of the rolls are arms 16, 16 which are formed with channels in their opposite faces in which are mounted blocks 17, 17. Threaded rods 18, 18, journaled in bearings 19, 19 mounted on the ends of the arms 16, 16, extend through the channels and also through the blocks 17, 17, so that by rotation of the rods the blocks may be moved in the channels toward and away from the rolls. The rods 18 carry beveled gears 20 on their outer ends and journaled in brackets 21, 21, secured to the bearings 19 is a rod 22 carrying bevel gears 23, 23 meshing with the gears 20. The rod 20 carries a crank 24 by which the threaded rods 18 may be simultaneously actuated to move the blocks 17 along the channels.

Supported between the blocks 17 is a feed block 25 which is substantially wedge-shaped in form with its apex extending toward the bite of the rolls. The upper and lower faces 26, and 27, respectively, of the block are hollowed out to form compartments 28 and 29. The faces 26 and 27 are also formed with a plurality of channels 30 separated by ridges 31 which lie above the faces of the block. These ridges 31 are of increasing thickness from the rear to the front end of the block so that the channels 30 are of decreasing width. Mounted on the front face of the block and forming the apex of the wedge, is an extension 32. The opposite faces 33 and 34 of the extension are slightly concave so as to fit the surface of the rolls closely, and which form continuations of the ridges 33 these faces are provided with ridges 35 and define channels 36 which are extensions of the channels 30 formed in the faces of the block. The ridges 35 are substantially triangular in form so that the channels 36 taper considerably in width for a purpose later to be described and the upper flat faces of the ridges 35 lie in contact with the surfaces of the rolls so that from the edge 37 of the extension 32 forwardly the rolls and the extension co-act to form a plurality of closed tapering passages. Also, as will be seen, from Fig. 2, the ridges 31 and 35 formed in one face of the block and the extension lie in staggered relation to the ridges 31 and 35 formed in the other face of the block and extension so that at the forward edge of the extension the discharge openings of the closed passages communicating with either face of the block as above referred to are in alternation and the adjacent edges of these passages are separated transversely of the block only a slight distance. It will also be seen that the discharge end 38 of the extension 32 lies separated a short distance to the side of the point where the surfaces of the rolls lie closest to each other so that the distance between the surfaces of the rolls at the point of nearest approach is less than the thickness of the edge 38.

In making use of the apparatus the rolls 11 and 12 are relatively adjusted so that the distance between their surfaces corresponds to the thickness of the sheet which is to be made. The block 25 is then moved so that the faces of the extension lie in contact with the surfaces of the rolls. A supply of rubber compound of the desired color is then placed in the compartments 28 and 29. The rolls, as has previously been explained, are steam-heated as is also the block by introducing steam in the passage 39 formed therethrough. Upon the rolls being rotated the rubber is fed from the compartments 28 and 29 down through the channels in the extension 32 where it is discharged in the form of separate strips. The strips formed from the supply of rubber in one compartment are kept separate from the strips formed from the supply in the other compartment, and these preformed strips are discharged substantially in a plane from the end of the extension. The series of strips then passes outwardly through the rolls and during such passage the strips are subjected to pressure by the heated rolls so that they are caused to spread laterally sufficiently to bring their adjacent edges into contact and unite. The pressure which produces this action is applied in a direction normal to the faces of the strips but has a component which is exerted in a direction parallel to these faces, or, in other words, normal to the edges which are to be united. The strips are discharged with their adjacent edges so close together that the pressure required to cause these adjacent edges to unite is not sufficient to produce a substantial deformation. As the machine operates, therefore, a sheet is formed consisting of a plurality of strips formed of the compounds placed in the two compartments and these strips are continuously united immediately after their formation to produce a sheet. Consequently with this machine the plastic rubber compounds are formed into sheets and in the process of formation the striped effect is produced. It will be understood that it would be impossible to place supplies of the two different materials of which the sheet is to be made in the same compartment and form a striped sheet therefrom, since as the rolls rotate the mass of compound is moved about in the compartment and if this mass were made of different materials the result would be the formation of a mottled sheet in which it would be impossible to confine either kind of rubber to a distinct area.

In the embodiment of the machine illustrated the sheet produced consists of rubber of two different colors and the feed block and its extension are formed to produce a sheet having alternate stripes of equal width. However, it is possible to design a feed block having its feed channels properly arranged to produce a sheet having stripes of any desired width and it is also possible to arrange this feed block so that the stripes vary in width throughout the width of the sheet. Also the feed block may have its feed channels arranged so that the stripes appearing in the sheet of one color may be of different width from the stripes of the other color. By suitably designing this block a striped sheet of any desired character may be produced without difficulty and in every case the sheet is homogeneous throughout, is of uniform thickness, and the stripes are accurately defined and the edges clean cut throughout its length.

While I have illustrated a feed block arranged so as to form two compartments so as to produce a sheet material consisting of stripes of two colors, it is clear that these compartments may in turn be subdivided and supplies of different materials placed in the subdivisions thereof. This makes it possible to secure a greater variation in the color combinations in the finished product. Also by properly adjusting the relative positions of the rolls 11 and 12 and the position of the block 25 in relation thereto, it is possible to produce sheets of varying thicknesses. This adjustment is easily made by the use of the means provided for the purpose and previously described.

In Figs. 5 to 9, inclusive, I have illustrated a modified form of the apparatus in which the material is positively fed from the supplies by instrumentalities other than the rolls. In this apparatus, illustrated somewhat diagrammatically in the drawings, the mill is provided with the usual rolls 11 and 12, and a feed block 40 of wedge shape is mounted to cooperate with these rolls. This feed block has an extension 41, the faces of which conform closely to the contour of the rolls. Formed through the feed block is a plurality of passages 42 of substantially oblong cross section but tapering from their rear ends 43 to their discharge outlets 44. At the rear end of the block is a box 45 which serves as a steam jacket for a series of cylindrical feeding chambers 46 with openings 47. These chambers have conical forward ends 48 which communicate with one or more of the passages 42. In the illustrated machine each chamber 46 communicates with three of the passages 42 but if desired a single feed mechanism presently to be explained may be used to feed one or any greater number of the passages 42. In the feed block shown the passages are formed in two series, one series extending upwardly from the discharge end to the inlet, the other downwardly and the feeding devices as, illustrated in Fig. 5, also are arranged in an upper and lower series with each feeding device supplying three of the passages 42.

Within each feed chamber 46 near its forward end is a spider 49 in which is the forward bearing for a shaft 50, the rear end of which extends beyond the box 45 and carries a gear 51 driven by a worm 52 on a shaft which extends throughout the width of the box. This shaft 50 carries a screw blade 53 and when the rubber compound is placed in the feed chamber through the inlet opening 47 the rotation of the shaft 50 forces this material forwardly through the cone 48 into the passages 42 which open into the cone. The box 45 is heated by means of steam introduced through a pipe 54 and withdrawn through a pipe 55. This steam serves to heat the feeding chambers 46 and keep the rubber compound therein in plastic condition so that it will be properly fed. The block 40 may also be heated by steam introduced into the passageway 56 and the extension 41 will be kept at the proper temperature by reason of its contact with the surfaces of the heated rolls 11 and 12.

It will be seen from Fig. 9 that the passages 42 have their discharge outlets 44 lying in a plane so that the strips formed by forcing the plastic rubber mass through these passages also lie in a plane. The passages have the proper dimensions so as to form strips which correspond to the width of the stripes in the finished sheet and the intervals indicated at 57 between a pair of adjacent strips is very small. Consequently when these strips are discharged from the extension 41 and then fed between the rolls 11 and 12 sufficient pressure is exerted by these rolls so that the strips will spread laterally and their adjacent edges will unite. In the apparatus illustrated there are shown eight feeding devices, each of which produces three strips. The strips produced by a vertical pair of feeding devices such as 58 and 49 are discharged so as to lie in alternation, this arrangement being repeated throughout the width of the block. It will be seen that it is possible, by means of this device to make a sheet containing stripes of eight different colors, and in the finished sheet each color will appear in three stripes located side by side but separated by single strips of another color. If, however, it should be desired to arrange the device so as to make a sheet consisting of a plurality of strips, each of which has a different color, then the feeding device would be changed so that each feeding device would supply a single passage and with such an arrangement any color variations desired could be produced. The modifications in design necessary to produce a sheet of any desired characteristics, however, will be clear from a description of the apparatus as given above. The feeding devices associated with the block are preferably arranged so that the block and these devices may be placed in various positions of adjustment relative to the rolls so that rubber sheets of different thicknesses may be used, but it will be seen that the principles of the invention as embodied in either type of device above described will remain the same; that is, in each case a rubber sheet is made from a plastic mass of rubber compound and in its formation it is given a striped appearance. This is brought about by making the sheet of a series of strips of the desired different colors and causing these strips to be united into a single sheet immediately upon their formation. The sheet consequently has no portions of varying thickness and by reason of the manner in which the strips of which it is composed are formed the stripes of color appearing in the final sheet may have any desired variation in width, and the arrangement of the different colors may be according to any desired pattern.

In Fig. 10, I have illustrated in cross section a piece of one type of striped rubber product which may be made by the process above described. In this piece of rubber, three different colors have been used and strips sheeted out from the plastic rubber masses have been united autogenously along their adjacent edges. In this portion of the sheet the stripe designated 60 is made of purple rubber, 61 of green, and 62 of red, and the strips have been arranged across the piece from left to right as follows: purple, green, red, green, purple, red. This order of succession, however, is merely typical of many others which could be used, and it is clear, of course, that there is no limitation to three colors, as shown. By the apparatus which is illustrated in Fig. 5, it is possible to make a product in which there are stripes of eight different colors, but by simple modification in the apparatus it would be possible to produce a rubber product in which each stripe was made of a different colored material. The apparatus consequently is capable of being employed for the production of a large number of different products, and, furthermore, it is not necessary that the stripes appearing in the final sheet should be of uniform width, since the orifice through which the plastic rubber compound is delivered to the rolls may be given any width that may be desired. This method and apparatus for making the striped rubber product, therefore, offers the widest possible latitude as to the kind of material which will be produced, since the number of colors which may be employed, the arrangement of the colored stripes in the product, and the width of these stripes, may be varied within wide limits.

While the method and apparatus has so far been described in connection with the formation of sheets of rubber, it will be clear that it may be used without substantial modification in the process of rubberizing sheets of textile material either on one or both faces. In the processes ordinarily used for that purpose the web of cloth is passed over a roll near which is mounted a knife or doctor. The plastic rubber compound is then placed at one side of the doctor so that as the cloth is drawn between the roll and the edge of the doctor a certain amount of rubber may be carried along with it, depending on the spacing of the doctor from the surface of the roll. By a proper application of the principles of this invention the rubber may be applied to the cloth so as to produce a striped effect. For this purpose a feed block will be used having closed passages formed through it and these channels will communicate with supplies of the rubber compound which may be in a plastic condition and fed positively through the channels by suitable means, as, for instance, the driven screw conveyors illustrated in Fig. 5, or else the rubber used may be in a semi-liquid condition such that it will flow by gravity through the channels. The channels will be located in the block so as to produce strips of the proper width and in the proper location, and the feed block will be located so that the discharge end of the channels lies close to the surface of the fabric as the latter is passing over the face of a roll. As the rubber is discharged from the ends of the passages the strips formed are laid on the surface of the moving web and the latter may then be advantageously passed over a heating coil so as to dry the rubber. It is also possible to pass the cloth with the rubber strips laid upon it through heated rolls which also serve to dry the strips and further assist in causing their edges to unite so that the rubber forms a continuous sheet. When the rubber is used in a semi-liquid condition, however, the strips laid on the web will have a sufficient fluidity to cause their edges to flow together and unite so as to form a continuous rubber facing on the cloth. Also the rubber in the strips so made will flow into the interstices between the threads of the cloth to a sufficient extent to unite the rubber facing firmly to the cloth. The feed block used in this connection may have any appropriate design as may be required by the width of the strips, the thickness of the rubber coating to be applied, and the arrangement of the colors in the coating. The details of this design will be clear from a consideration of the forms of feed block previously described.

It is to be understood that the striped rubber product produced by the methods and apparatus previously described is not in the final form in which it will be used, but must be subjected to the usual vulcanizing processes. These processes, however, form no part of the present invention and are not described herein. Also, it is immaterial, so far as this invention is concerned, as to the composition of the rubber compounds which are employed in forming the striped rubber product. These compounds will be prepared by well-known methods and will have colors such as may be required by the pattern of the finished material. The preparation of such colored rubber compounds is well-known and has, therefore, not been specifically set forth.

I claim:

1. A method of forming striped sheets of rubber which comprises maintaining two supplies of different colored rubber adjacent the bite of a pair of rolls, one supply being maintained in contact with the surface of one of the rolls, the other supply in contact with the surface of the other roll, simultaneously forming a plurality of strips of rubber drawn from each of the supplies and arranged in alternation, laying these strips side by side as they are formed, and subjecting them to pressure to cause the edges of adjacent strips to unite.

2. A method of forming striped sheets of rubber which comprises maintaining two supplies of different colored rubber adjacent the bite of a pair of rolls, one supply being maintained in contact with the surface of one of the rolls, the other supply in contact with the surface of the other roll, simultaneously forming a plurality of strips of rubber drawn from each of the supplies and arranged in alternation, and in the forming operation laying the strips side by side substantially in a plane and uniting the strips into a continuous sheet by the application of pressure.

3. A method of forming striped sheets of rubber which comprises maintaining two supplies of different colored rubber in separated superposed relation, simultaneously forming a plurality of strips of rubber from each supply, laying these strips alternately as they are formed, and subjecting them to pressure to cause the adjacent edges to unite.

4. A method of forming striped sheets of rubber which comprises maintaining two supplies of different colored rubber adjacent the bite of a pair of rolls, one supply being maintained in contact with the surface of one of the rolls, the other supply in contact with the surface of the other roll, simultaneously forming a plurality of strips of rubber drawn from each of the supplies and arranged in alternation, and subjecting all of the strips to pressure while they are maintained substantially in a plane to cause their adjacent edges to unite, thereby producing a continuous striped sheet.

5. A method of forming striped sheets of rubber which comprises feeding rubber from a plurality of superposed supplies, simultaneously forming separate strips thereof lying substantially in a plane passing between the supplies, and uniting these strips into a continuous sheet by the simultaneous action of heat and pressure.

6. A method of forming striped sheets of rubber which comprises maintaining two supplies of different colored rubber adjacent the bite of a pair of rolls, one supply being maintained in contact with the surface of one of the rolls, the other supply in contact with the surface of the other roll, feeding rubber from the supplies, forming the rubber so fed into a plurality of strips arranged according to the pattern to be given the finished sheet and lying substantially in a plane, and then uniting these strips into a sheet by the simultaneous action of heat and pressure.

7. A method of forming striped sheets of rubber which comprises maintaining two supplies of different colored rubber in superposed relation, forming a plurality of individual strips drawn from the supplies, discharging these strips as they are formed substantially in a plane with the strips arranged according to a predetermined pattern, and then subjecting the strips simultaneously to pressure to cause them to unite along their adjacent edges.

8. A method of forming striped rubber sheeting which comprises maintaining a supply of rubber in contact with the face of one of a pair of rolls and a different supply in contact with the face of the other of the pair of rolls, forming a plurality of strips of rubber from the first supply, and leading these strips in contact with the first roll to the bite of the rolls, forming a plurality of strips of rubber from the second supply and leading these strips in contact with the surface of the second roll through the bite of the rolls, the strips from the different supplies being arranged in alternation, and, at the bite of the rolls, exerting pressure on the strips to cause their adjacent edges to unite to form a continuous sheeting 9. A method of forming striped sheets of rubber which comprises feeding rubber from a plurality of separate superposed supplies, forming strips of the rubber so fed lying substantially in a plane, while maintaining the rubber at an elevated temperature during the feeding and strip-forming operations, and uniting the strips into a continuous sheet by the simultaneous action of heat and pressure without substantially deforming the strips.

In testimony whereof I affix my signature.

JACOB STEIN.